US009446975B2

(12) United States Patent
Nickerson et al.

(10) Patent No.: US 9,446,975 B2
(45) Date of Patent: *Sep. 20, 2016

(54) GASIFYING SYSTEM AND METHOD

(71) Applicant: THERMA-FLITE, INC., Benicia, CA (US)

(72) Inventors: Robert Nickerson, Vallejo, CA (US); Mike Potter, Dallas, TX (US); John Whitney, El Dorado, AZ (US)

(73) Assignee: THERMA-FLITE, INC., Benicia, CA (US)

( * ) Notice: Subject to any disclaimer, the term of this patent is extended or adjusted under 35 U.S.C. 154(b) by 883 days.

This patent is subject to a terminal disclaimer.

(21) Appl. No.: 13/657,263

(22) Filed: Oct. 22, 2012

(65) Prior Publication Data

US 2013/0098750 A1 Apr. 25, 2013

Related U.S. Application Data

(60) Provisional application No. 61/549,792, filed on Oct. 21, 2011.

(51) Int. Cl.
*C10J 3/72* (2006.01)
*C02F 11/10* (2006.01)
(Continued)

(52) U.S. Cl.
CPC ............ *C02F 11/10* (2013.01); *C10J 3/007* (2013.01); *C10J 3/723* (2013.01); *F23G 5/027* (2013.01);
(Continued)

(58) Field of Classification Search
CPC ............ C10J 3/007; C10J 2200/152; C10J 2200/158; C10J 3/723; C10B 47/44; Y10S 165/226; Y10S 165/229; Y10S 209/913; B01F 7/00416; B01F 7/24; B01F 2015/0204; B01F 15/0251
See application file for complete search history.

(56) References Cited

U.S. PATENT DOCUMENTS 1,276,428 A 8/1918 Smith
1,468,379 A 9/1923 Easton
(Continued)

FOREIGN PATENT DOCUMENTS

CA 709336 A 5/1965
CN 101595439 A 12/2009
(Continued)

OTHER PUBLICATIONS

C. Ozgur Colpan, Feridun Hamdullahpur, Ibrahim Dincer, Yeong Yoo, "Effect of gasification agent on the performance of solid oxide fuel cell and biomass gasification systems", Oct. 3, 2009, international journal of hydrogen energy, 35 (2010), 5001-5009.*
(Continued)

*Primary Examiner* — Renee E Robinson
*Assistant Examiner* — Jonathan Pilcher
(74) *Attorney, Agent, or Firm* — Lando & Anastasi, LLP

(57) ABSTRACT

Systems and methods for treating carbon-containing waste materials include a gasifying system, a drier system for pre-drying the material, and an energy-recovery system for recovering waste heat and/or producer gas from the gasifying system/method for use in pre-drying the material. The energy-recovery system can include a recirculation system for recovering the waste heat and/or a thermal oxidizer or other combustion device for burning the producer gas, along with a heat-transfer-loop for transferring the recovered heat energy to the drier for pre-drying the material. In another aspect of the invention, the gasifying systems and methods use a thermal-screw conveyor with a product chamber and rotary thermal screws, and an oxygen-delivery system configured for delivering oxygen into the product chamber for immediate absorption into the material, with or without the dryer system and/or the energy-recovery system.

12 Claims, 8 Drawing Sheets

(51) Int. Cl.

| | |
|---|---|
| *C10J 3/00* | (2006.01) |
| *F23G 5/027* | (2006.01) |
| *F23G 5/04* | (2006.01) |
| *F23G 5/46* | (2006.01) |
| *F23G 7/00* | (2006.01) |
| *C02F 11/12* | (2006.01) |

(52) U.S. Cl.
CPC . *F23G 5/04* (2013.01); *F23G 5/46* (2013.01); *F23G 7/001* (2013.01); *C02F 11/12* (2013.01); *C02F 2209/005* (2013.01); *C10J 2200/152* (2013.01); *C10J 2200/158* (2013.01); *C10J 2300/0909* (2013.01); *C10J 2300/0916* (2013.01); *C10J 2300/0923* (2013.01); *C10J 2300/0946* (2013.01); *C10J 2300/0956* (2013.01); *C10J 2300/1215* (2013.01); *C10J 2300/1246* (2013.01); *C10J 2300/1869* (2013.01); *F23G 2201/303* (2013.01); *F23G 2201/40* (2013.01); *F23G 2206/10* (2013.01); *Y02P 20/129* (2015.11); *Y02W 10/30* (2015.05); *Y02W 10/37* (2015.05); *Y02W 10/40* (2015.05)

(56) References Cited

U.S. PATENT DOCUMENTS

| | | |
|---|---|---|
| 1,481,627 A | 1/1924 | Smith |
| 1,713,840 A | 5/1929 | Laucks |
| 1,723,932 A | 8/1929 | Greene et al. |
| 1,751,127 A | 3/1930 | Cantieny |
| 1,810,828 A | 6/1931 | Hayes |
| 1,881,826 A | 10/1932 | McQuade |
| 1,921,993 A | 8/1933 | McQuade |
| 1,972,929 A | 9/1934 | Fisher |
| 2,357,621 A | 9/1944 | Tuttle |
| 2,998,375 A | 8/1961 | Peterson et al. |
| 3,023,456 A | 3/1962 | Palfey |
| 3,051,629 A | 8/1962 | Gorin et al. |
| 3,082,816 A | 3/1963 | Skidmore |
| 3,177,128 A | 4/1965 | Vartanian |
| 3,178,361 A | 4/1965 | Bailey |
| 3,184,293 A | 5/1965 | Work et al. |
| 3,251,751 A | 5/1966 | Lindahl et al. |
| 3,401,089 A | 9/1968 | Friedrich et al. |
| 3,525,124 A | 8/1970 | Ocker |
| 3,658,654 A | 4/1972 | Gutberlet |
| 3,787,292 A | 1/1974 | Keappler |
| 3,950,143 A * | 4/1976 | Pyle .................. C10B 53/02 201/35 |
| 3,976,548 A | 8/1976 | Kevorkian et al. |
| 4,084,521 A | 4/1978 | Herbold et al. |
| 4,094,746 A | 6/1978 | Masciantonio et al. |
| 4,094,769 A | 6/1978 | Brown |
| 4,098,649 A | 7/1978 | Redker |
| 4,106,997 A | 8/1978 | Kevorkian et al. |
| 4,140,478 A | 2/1979 | Kawakami et al. |
| 4,206,713 A | 6/1980 | Ryason |
| 4,235,676 A | 11/1980 | Chambers |
| 4,308,103 A | 12/1981 | Rotter |
| 4,395,309 A | 7/1983 | Esztergar |
| 4,399,906 A | 8/1983 | Millsap |
| 4,439,306 A | 3/1984 | Voetter et al. |
| 4,466,809 A | 8/1984 | Kissel et al. |
| 4,483,257 A | 11/1984 | Otter |
| 4,583,995 A | 4/1986 | Winckler et al. |
| 4,584,060 A | 4/1986 | Winckler et al. |
| 4,671,800 A | 6/1987 | Meyer et al. |
| 4,686,008 A | 8/1987 | Gibson |
| 4,704,134 A | 11/1987 | Meyer et al. |
| 4,705,603 A | 11/1987 | McMullen et al. |
| 4,908,104 A | 3/1990 | Loomans et al. |
| 5,017,269 A | 5/1991 | Loomans et al. |
| 5,057,189 A | 10/1991 | Apffel |
| 5,082,534 A | 1/1992 | Breu |
| 5,151,159 A | 9/1992 | Wolfe et al. |
| 5,175,993 A | 1/1993 | Raiko et al. |
| 5,227,026 A | 7/1993 | Hogan |
| 5,296,005 A | 3/1994 | Wolfe et al. |
| 5,417,492 A | 5/1995 | Christian et al. |
| 5,697,168 A | 12/1997 | Matthys et al. |
| 6,790,023 B2 * | 9/2004 | Collins ................ B29C 47/92 425/145 |
| 8,444,828 B2 * | 5/2013 | Wolfe ...................... C10B 47/44 201/15 |
| 8,739,963 B2 * | 6/2014 | Nickerson .............. B65G 33/18 198/604 |
| 9,126,360 B2 * | 9/2015 | Qiu ............................ B28B 3/22 |
| 2008/0149471 A1 * | 6/2008 | Wolfe ...................... C10B 47/44 201/8 |
| 2008/0209807 A1 | 9/2008 | Tsangaris et al. |
| 2008/0295356 A1 | 12/2008 | Nickerson |
| 2010/0051233 A1 | 3/2010 | Whitney et al. |
| 2010/0101141 A1 * | 4/2010 | Shulenberger .......... C10B 47/44 44/589 |
| 2010/0223839 A1 | 9/2010 | Garcia-Perez et al. |
| 2011/0173887 A1 * | 7/2011 | Tyer, Sr. ................. C10J 3/007 48/197 R |
| 2012/0205219 A1 | 8/2012 | Nickerson et al. |
| 2014/0231222 A1 * | 8/2014 | Nickerson .............. B65G 33/18 198/604 |

FOREIGN PATENT DOCUMENTS

| | | |
|---|---|---|
| CN | 102216720 A | 10/2011 |
| EP | 1447438 A1 | 8/2004 |
| GB | 793518 A | 4/1958 |
| JP | 2006152103 A | 6/2006 |
| WO | 2010045320 A2 | 4/2010 |
| WO | 2010075536 A1 | 7/2010 |
| WO | 2011106895 A1 | 9/2011 |

OTHER PUBLICATIONS

The International Search Report and the Written Opinion of the International Searching Authority, Feb. 27, 2013; United States Patent and Trademark Office, Alexandria Virginia, 13 pages.
Therma-Flite General Description of the "Electric-Scru" Processor, Internet web-page, on or before Sep. 20, 2011, 2 pages.
Therma-Flite General Description of the "Pyro-Scru", Internet web-page, on or before Sep. 20, 2011, 1 page.
Therma-Flite General Description of the "Holo-Scru" Processor, Internet web-page, on or before Sep. 20, 2011, 3 pages.
Therma-Flite IC Series BIO-SCRU "Biosolids" Dryer System, Internet web-page, on or before Sep. 20, 2011, 2 pages.
Therma-Flite IC Series "BIO-SCRU" Dryer System, Recycle Municipal Waste into Class A PFRP Biosolids Replacing Chemical Fertilizers, Providing Technology for a Sustainable Future, Internet web-page, on or before Sep. 20, 2011, 4 pages.
CN 201280060720.6 Corresponding CN Application, First Notification of Office Action, dated Jul. 3, 2015.
CN 201280060720.6 Corresponding CN Application, First Search Report dated Jul. 3, 2015.
Extended European Search Report from corresponding EP Application No. 12841668.2 dated Oct. 7, 2015.

* cited by examiner

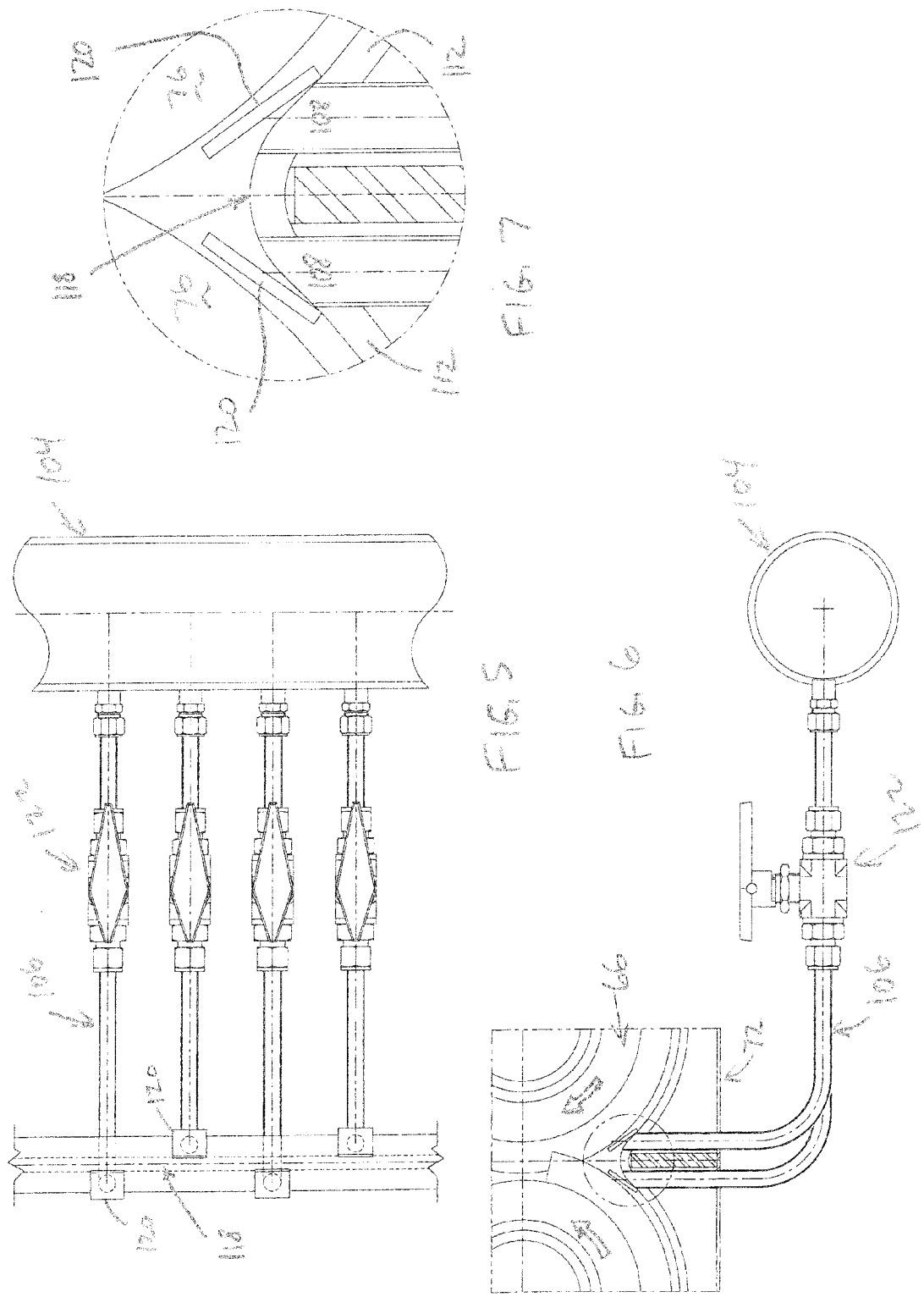

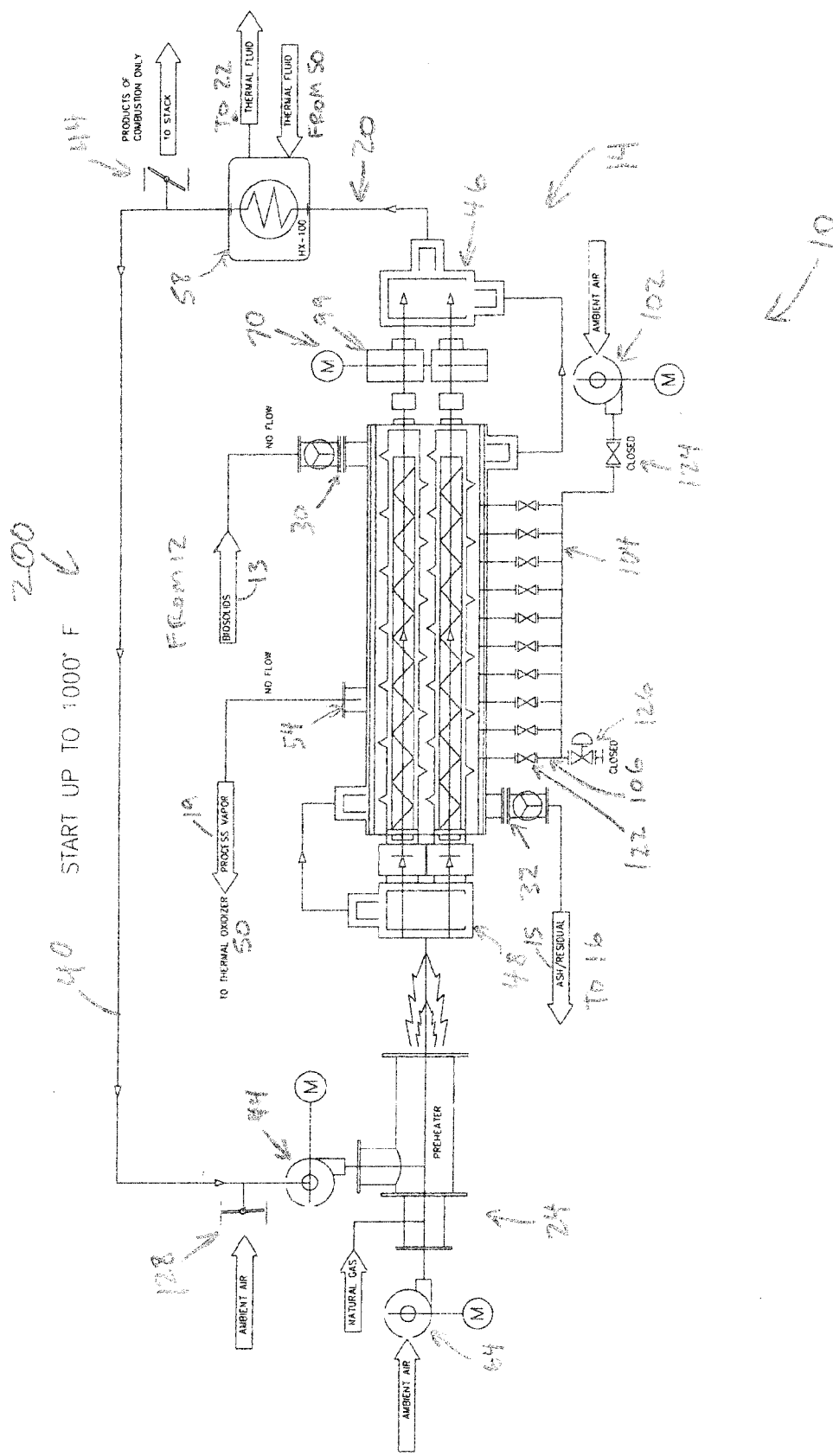

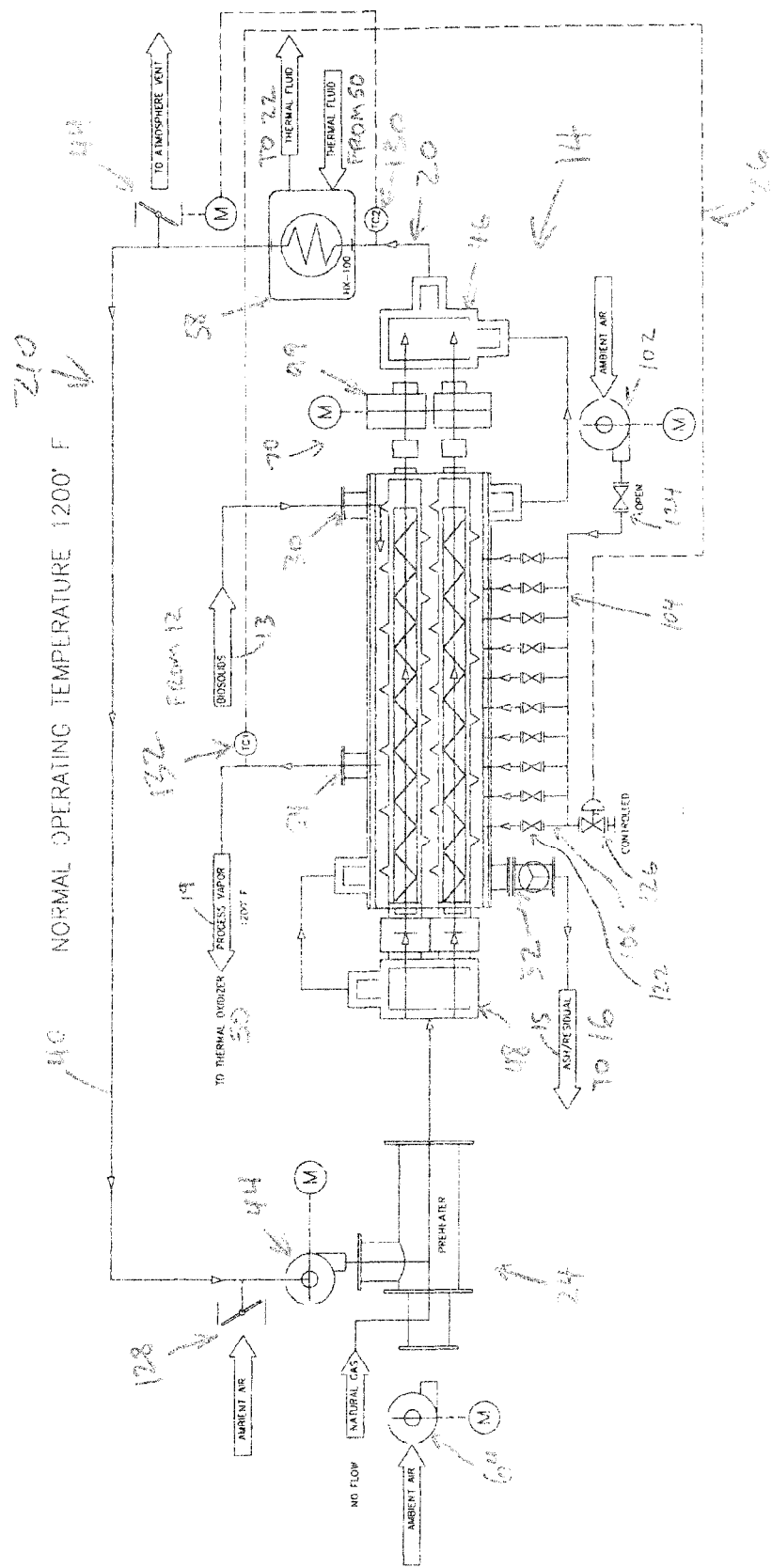

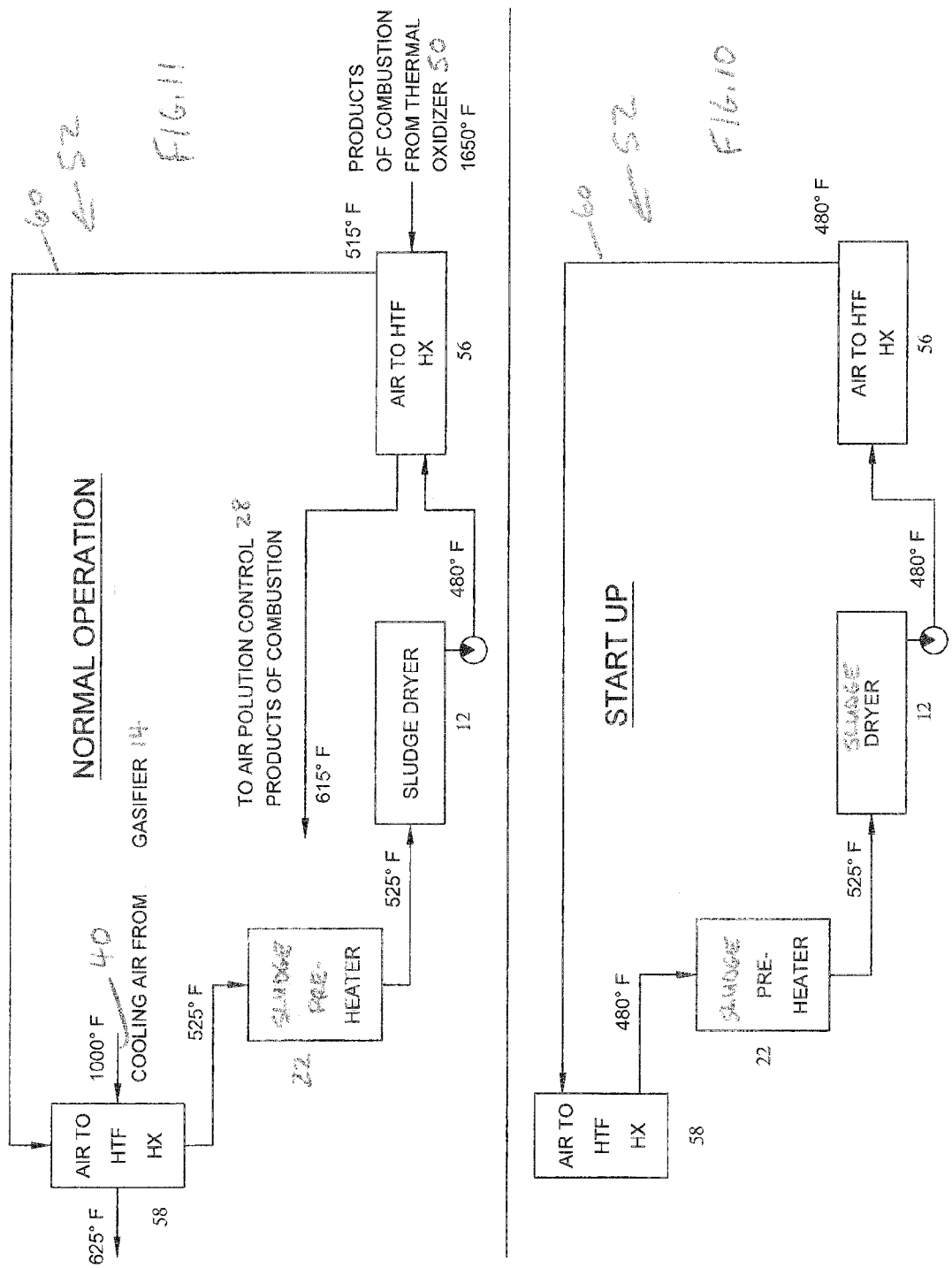

GASIFYING SYSTEM AND METHOD

CROSS-REFERENCE TO RELATED APPLICATION

This application claims the priority benefit of U.S. Provisional Patent Application Ser. No. 61/549,792, filed on Oct. 21, 2011, which is hereby incorporated herein by reference.

TECHNICAL FIELD

The present invention relates generally to waste-treatment systems and methods for gasifying carbon-containing materials, and more particularly to such systems and methods incorporating thermal-screw systems and methods for conveying a material while transferring heat relative to the conveyed material.

BACKGROUND

The disposal of low-value carbon-containing waste materials is a major challenge and problem. This is particularly true for carbon-containing waste materials that have high ash content, are in chunks, and/or are wet. Examples of these materials include wet biosolids (sludge) or dry biosolids from municipal wastewater plants, municipal solid waste (MSW), rice hulls, biomass such as log-yard waste and forestry waste, and mixed or separated rubber, plastic, and/or paper.

Table A below lists the approximate values of some relevant properties for some of these example carbon-containing waste materials.

TABLE A

| Material | Water content (%) | Ash content (%) | Chunks | Disposal cost ($/ton) | Avail. energy (BTU/#) |
|---|---|---|---|---|---|
| Wet biosolids (sludge) | 82 | 6-7 | No | 45-70+ | N/A |
| Dried biosolids, 20% of wet weight | 10 | 30+ | No | 40-50 | 6,800 |
| MSW | 35 | 14 | Yes | 27-50 | 4,200 |
| Rice hulls | 15 | 10 | No | 0-25 | 5,600 |
| Log-yard waste (biomass) | 25 | 8 | Yes | 10-27 | 5,200 |
| Mixed rubber/plastic/paper | 12 | 8 | Yes | 27-40 | 10,000 |

As can be seen from this table, all of these example carbon-containing waste materials tend to have relatively high ash content. All of these example materials except rice hulls and biosolids have significant chunks in the material, even when shredded. And wet biosolids and forestry waste biomass as processed include very large amounts of water.

For disposal, these materials have traditionally been incinerated, land-filled, or left to biodegrade, with the energy value contained in them left unrecovered. But because of their high water content, high ash content, and/or chunky consistency, disposing of these materials can be a real challenge. Materials with high water content, such as wet biosolids and forestry waste biomass, tend to be high in weight and volume, and this increases the cost to transport them to a site for incinerating, land-filling, or biodegrading. So these materials are typically dried by natural-gas-powered dryers to reduce their weight and volume. But this requires burning additional fuel, adding to the cost and pollution issues. And wet biosolids in particular cannot be incinerated without prior drying unless additional fuel is burned during incineration. For materials with high ash content, the ash typically becomes sticky during incineration by temperatures of about 1400 F, thereby requiring frequent processing-system shut-downs to clean out the equipment. And materials that have chunks are not easily fed continuously and uniformly into the process for combustion. Additionally, chunky materials must have considerable residence time at combustion temperature to burn until consumed, and chunky materials with high ash content tend to form surface coatings of ash that inhibit complete burnout unless they are mechanically agitated. Furthermore, generally speaking, incineration and land-filling solutions have major public-perception problems.

Another option for disposal of carbon-containing waste materials is gasification. This approach typically recovers some energy from the material (in the form of producer-gas fuel aka syngas) and as such is more environmentally acceptable. And this approach achieves an initial separation of the ash at a lower temperature (typically about 100 F lower) and in less time, with minimal slagging of the ash as there are less volatile toxic metals (e.g., Pb & As) in the vent gases and therefore less air pollution. But this approach also has its drawbacks. For example, for waste materials having high ash content, the ash sometimes becomes sticky by temperatures lower than 1400 F under reducing conditions during gasification.

Accordingly, it can be seen that there exists a need for a better environmentally acceptable way of disposing of carbon-containing waste materials that have high ash content, are in chunks, and/or are wet. It is to the provision of solutions to this and other problems that the present invention is primarily directed.

SUMMARY

Generally described, the present invention relates to systems and methods for treating carbon-containing waste materials. The systems and methods can be used to treat dry biosolids or wet sludge, as described herein. Or systems and methods can be used to treat other carbon-containing waste materials, such as rice hulls, forestry biomass, solid municipal waste, or composite materials. As such, it will be understood that the embodiments described herein for treating dry biosolids and wet sludge are representative examples for illustration purposes only and are not unnecessarily limiting of the invention.

In one aspect of the invention, systems and methods for treating carbon-containing waste materials include the use of a gasifying system for gasifying the material, a drier system for pre-drying the material, and an energy-recovery system for recovering waste heat and/or producer gas exhausted from the gasifying system/method and using it when pre-drying the material with the drier system. The energy-recovery system can include an air recirculation system for recovering the waste heat from the gasifying system. Additionally or alternatively, the energy-recovery system can include a combustion device such as a thermal oxidizer for burning the producer gas exhausted from the gasifying system and method. Furthermore, the energy-recovery system can include at least one heat-transfer loop with one or more heat exchangers for absorbing the recovered heat energy and transferring it to the sludge drier for use in pre-drying the material. In addition, an ash cooler can be used to cool the ash residue produced by the gasifying system and method prior to disposal.

In another aspect of the invention, the gasifying systems and methods use a thermal-screw conveyor and an oxygen-delivery system. The thermal-screw conveyor includes a product chamber and rotary thermal screws each including a rotor and flighting that intermeshes with the flighting of the adjacent thermal screw. And the oxygen-delivery system is configured for delivering oxygen into the product chamber for immediate absorption into the material. These specialized gasifying systems and methods can be used with or without the dryer system and/or the energy-recovery system. Furthermore, in some embodiments the thermal-screw conveyor includes internal passageways in the rotors, flighting, and/or housing for carrying a thermal fluid for transferring heat to the material in the product chamber.

And in yet another aspect of the invention, control systems and methods are used for operating these and other waste-treatment systems. In typical embodiments, the controls operate to monitor the start-up of the system, then transition from the start-up mode to the normal-operation mode. In the start-up mode, the gasifying system is pre-heated for example by a gasifier pre-heater. In the normal-operation mode, the controls operate the energy-recovery system to recover and reuse the waste energy from the gasifying system. And the controls monitor predefined operating parameters (e.g., temperature and pressure) and based thereon control the oxygen delivered to the product chamber, the hot air vented from the recirculation ductwork, the ambient air drawn into the recirculation ductwork, and/or other process variables to maintain the desired chemical reaction in the product chamber.

The specific techniques and structures employed by the invention to improve over the drawbacks of the prior devices and accomplish the advantages described herein will become apparent from the following detailed description of example embodiments of the invention and the appended drawings and claims.

BRIEF DESCRIPTION OF THE DRAWINGS

FIG. 5 is a top view of a portion of an oxygen-delivery system of the gasifying system of FIG. 1.

FIG. 6 is an end view of the oxygen-delivery system portion of FIG. 5, showing a portion of a thermal-screw conveyor in cross section.

FIG. 7 is a detail view of a portion of the oxygen-delivery system and the thermal-screw conveyor of FIG. 6.

FIG. 8 is a functional process diagram of the waste-treatment system of FIG. 1 with a modified screw-drive assembly, showing the start-up operation of the system.

FIG. 9 is a functional process diagram of the waste-treatment system of FIG. 1 with a modified screw-drive assembly, showing the normal operation of the system.

FIG. 10 is a block process diagram of a heat-transfer-fluid loop of the waste-treatment process of FIG. 8 during the start-up operation of the system.

FIG. 11 is a block process diagram of a heat-transfer-fluid loop of the waste-treatment process of FIG. 9 during the normal operation of the system.

DETAILED DESCRIPTION OF EXAMPLE EMBODIMENTS

The present invention relates to a system and method for treating carbon-containing waste materials for disposal. The waste-treatment system can be operated by the method to first dry the carbon-containing waste material, then gasify it into a residual material and producer gas (e.g., syngas), and then cool the residual material for low-cost disposal, with the waste heat recirculated and the producer gas burned during drying and gasifying so that the system is primarily self-powering with little external energy required, and in some cases can be energy positive (i.e., producer gas can be generated for other uses). This system and method can be used to treat carbon-containing waste materials such as sludge or biosolids from municipal wastewater plants, municipal solid waste (MSW), rice hulls, biomass such as log-yard waste and forestry waste, and mixed or separated rubber, plastic, and/or paper. This system and method can be also used to treat carbon-containing materials that are relatively refractory materials such as coal, or other carbon-containing materials that are not necessarily waste. And this system and method can be operated as a pyrolizer or a combination pyrolizer and gasifier. As such, references to "sludge," "ash," etc. are included in the specification for the purpose of illustrating example embodiments only, and are not intended to limit the scope of the invention as claims. And as used herein, the term "gasifying" is intended to be broadly construed to also include pyrolizing, torrefacting, treating refractory materials, and other thermal processes, not just gasifying.

Figure 1:
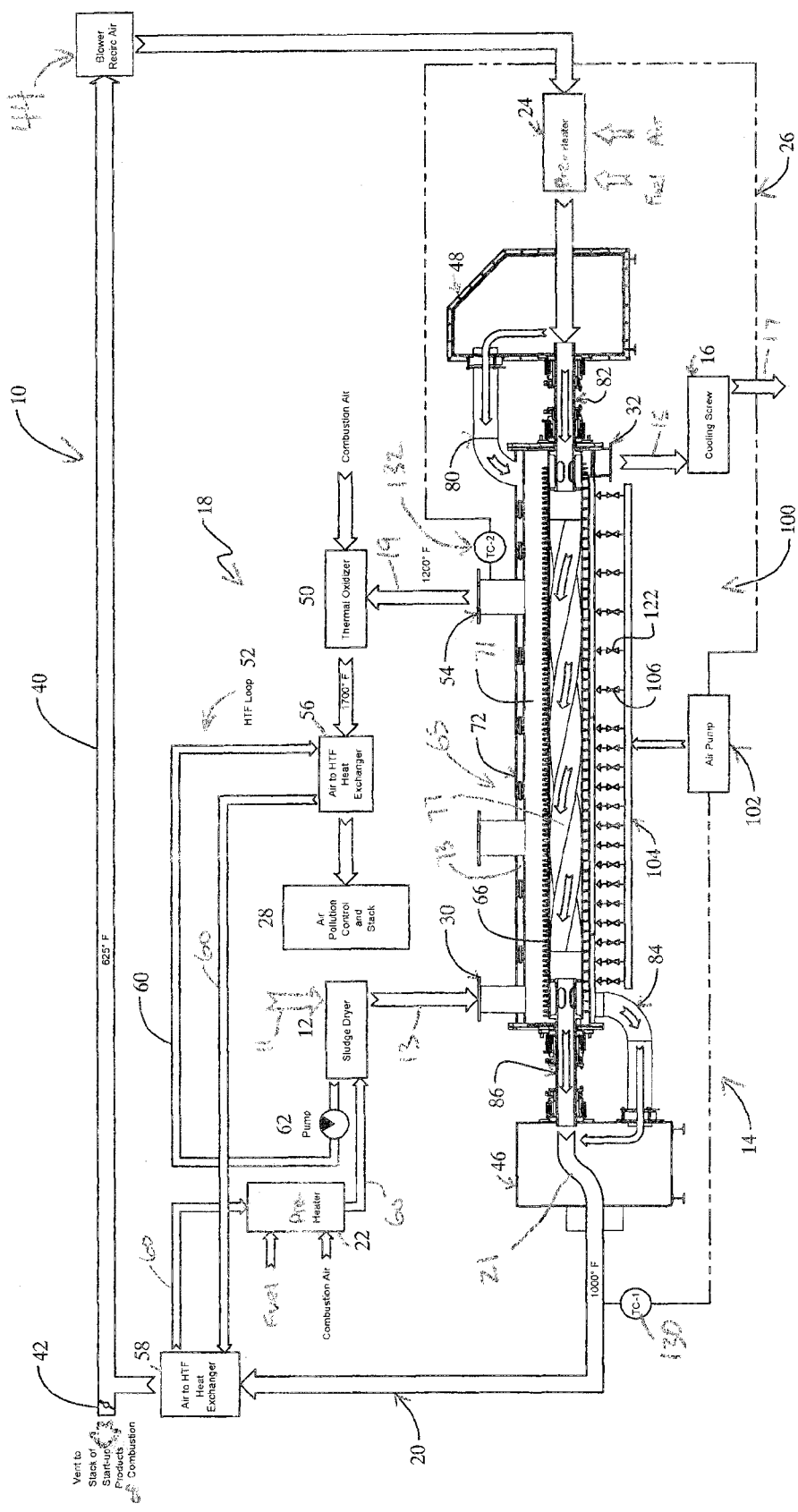
FIG. 1 is a schematic diagram of a waste-treatment system according to an example embodiment of the invention, showing a gasifying system in cross section and the remaining components in block form.
Figure 2:
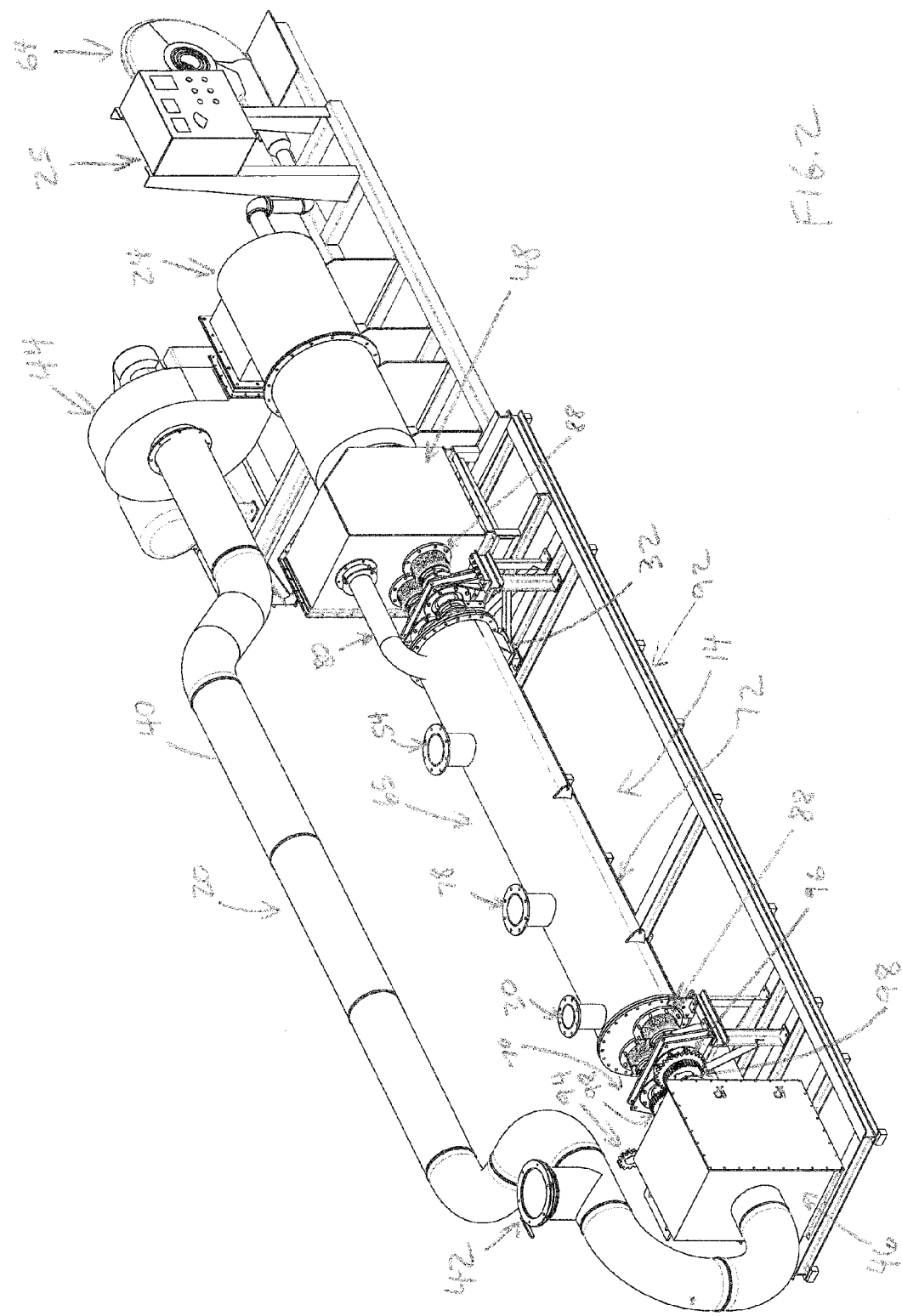
FIG. 2 is a perspective view of a portion of the waste-treatment system of FIG. 1, showing a portion of the gasifying system along with an air-recirculation system, a gasifier pre-heater, and a control system.
Figure 3:
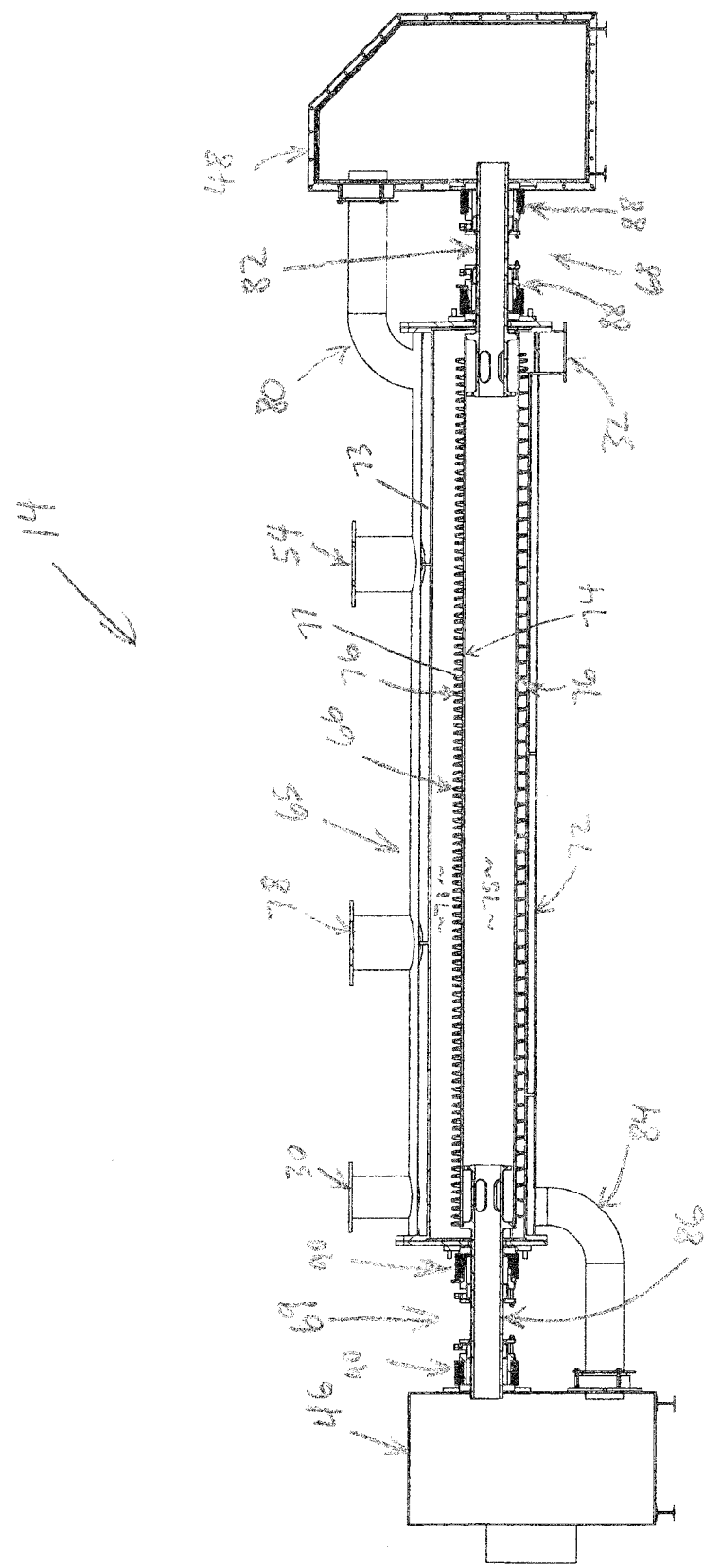
FIG. 3 is a side cross-sectional view of a portion the gasifying system of FIG. 1.

FIGS. 1 and 2 show a waste-treatment system 10 according to an example embodiment of the invention. The waste-treatment system 10 of this embodiment is designed for processing sludge or biosolids for lower-cost disposal with minimal energy consumed by the process. The waste-treatment system 10 can be readily adapted, and other embodiments of the invention can be provided, for use in related processes for treating other carbon-containing waste materials for disposal, as will be understood by persons of ordinary skill in the art.

The waste-treatment system 10 of this embodiment includes a dryer 12, a thermal-process (e.g., gasifying) system 14, a residue cooler 16, an energy recovery system 18, a recirculation system 20, a drier pre-heater 22, a gasifier pre-heater 24, and a control system 26. The waste-treatment system 10 can also include additional systems and components such as air-pollution control equipment 28. Such air-pollution control equipment 28 can include conventional components such as scrubbers, condensers, thermal oxidizers, and the like, which are well-known in the art and thus not detailed herein.

The gasifying system 14 is fed biosolids 13 from the dryer 12, which pre-dries waste material (e.g., wet sludge) 11 into the pre-dried material (e.g., biosolids) 13. And the gasifying system 14 outputs residuals (e.g., hot ash) 15 that are fed to the cooler 16 for cooling for disposal, producer gas (e.g., syngas) 19 that is fed to the energy recovery system 18 for recovery and beneficial reuse, and waste heat (i.e., hot air) 21 that is fed to the air-recirculation system 20 for recovery and beneficial reuse. The ash cooler 16 cools the hot ash residuals 15 into cooled ash residuals 17 for disposal. The air-recirculation system 20 recirculates the waste heat 21 back to the gasifying system 14 for reuse and also exchanges heat with the energy recovery system 18 to help heat the gasifying system during startup, to help heat or cool (as needed) the gasifying system during normal operation, and to help heat the sludge dryer 12. During the normal operation of the waste-treatment system 10, the energy recovery system 18 burns the producer gas 19 and transfers the generated heat to the sludge dryer 12 for pre-drying the waste material. During start-up, heat is provided to the sludge dryer 12 and the gasifying system 14 by the sludge-drier pre-heater 22 and the gasifier pre-heater 24, respectively. And the control system 26 controls the operation of all of these system components.

The sludge dryer 12 has a material outlet that is operably connected (e.g., by ducting and/or a conveyor) to the material inlet 30 of the gasifying system 14, and can be of a conventional design and construction known to persons of ordinary skill in the art. For example, the sludge dryer 12 can be a thermal-screw dryer system having a housing for two rotating thermal screws each with a rotor and intermeshing flighting that conveys the input wet sludge waste material 11 axially and with a heat-transfer fluid (HTF) circulated through hollow passageways of the rotors, the flighting, and/or the screw housing (e.g., double-walled) to dry the wet sludge waste material 11 into the dry biosolid material 13. In the depicted embodiment, the HTF or heat-transfer fluid is oil, but in alternative embodiments other conventional HTFs (e.g., water/glycol or steam) can be used. The sludge dryer 12 can be provided with additional equipment such as an input/feed hopper and a scrubber/condenser. Also, the sludge dryer 12 includes and/or is operably coupled to control components for controlling its operation, which control components can be included in and operated by the control system 26. As an example, such thermal-screw dryer systems are provided commercially under the BIO-SCRU trademark by Therma-Flite, Inc. of Benicia, Calif., and disclosed in U.S. Patent Application Pub. No. 2008/0295356, published Dec. 4, 2008, which is hereby incorporated herein by reference.

The ash cooler 16 has a material inlet that is operably connected (e.g., by ducting and/or a conveyor) to the ash residual material outlet 32 of the gasifying system 14, and can be of a conventional design and construction known to persons of ordinary skill in the art. For example, the ash cooler 16 can be a thermal-screw cooler system having a housing for two rotating thermal screws each with a rotor and intermeshing flighting that conveys the input ash residual material 15 axially and with a heat-transfer fluid (e.g., a refrigerant or cooling water) circulated through hollow passageways of the rotors, the flighting, and/or the housing (e.g., double-walled) to cool the hot ash residual material 15 into cooled ash residual material 17. In the depicted embodiment, the HTF or heat-transfer fluid is water, but in alternative embodiments other conventional HTFs (e.g., water/glycol, oil or unheated air) can be used. And in the depicted embodiment treating biosolids, the residue is hot ash, but in alternative embodiments treating other carbon-containing materials the residue can include other materials. The ash cooler 16 can be provided with additional equipment such as an input/feed ash hopper, an output ash hopper, and a system for recovering the waste heat and returning it for use in the gasifying system 14 and/or the sludge dryer 12. Also, the ash cooler 16 includes and/or is operably coupled to control components for controlling its operation, which control components can be included in and operated by the control system 26. As an example, such thermal-screw cooler systems are provided commercially under the HOLO-SCRU trademark by Therma-Flite, Inc. of Benicia, Calif., and disclosed in U.S. Patent Application Pub. No. 2010/0051233, published Mar. 4, 2010, which is hereby incorporated herein by reference.

In alternative embodiments, the waste-treatment system is provided with at least one sludge drier and/or at least one ash cooler of a different, more-conventional design. That is, the sludge drier and/or ash cooler can be of a conventional design and construction without rotary thermal screws. And in some alternative embodiments, the waste-treatment system is provided without a sludge drier and/or an ash cooler, for example, in applications where the waste material to be gasified is introduced into the gasifying system sufficiently dry and/or in applications where the gasified waste material exits the gasifying system sufficiently cool or directly into a water quench.

The air-recirculation system 20 can be of a conventional design and construction for recirculating the waste heat 21 exhausted from the gasifying system 14 to provide heat to the gasifying system 14 during startup and to the energy recovery system 18 during normal operation. Such design and construction of conventional systems for recirculating air are known to persons of ordinary skill in the art.

In the depicted embodiment, for example, the air-recirculation system 20 includes ductwork 40, at least one vent 42, and at least one air mover 44. The ductwork 40 extends from the air outlet 46 of the gasifying system 14 back around to the air inlet 48 of the gasifying system and is typically made of metal. The vent 42 can be located in the ductwork 40 (e.g., at a "tee" or "ell"), is openable to exhaust (e.g., to the stack or the combustion air of the thermal oxidizer) the products of combustion from the gasifier pre-heater 24 or cooling air and includes and/or is operably coupled to control components for controlling such opening and closing, which control components can be included in and operated by the control system 26. And the air mover 44 can be provided by a conventional air blower (e.g., an impeller operably connected to an electric motor), a pump, etc., connected inline with the ductwork 40, and includes and/or is operably coupled to control components for controlling its operation, which control components can be included in and operated by the control system 26. An example such air mover 44 is the 20GI Fan commercially available from The New York Blower Company of Willowbrook, Ill.

The air mover 44 operates the same in the startup mode as in the normal operating mode, and in the depicted embodiment is selected for normal operation with hot air 21 delivered from the gasifying system 14 into the recirculation ductwork 40 at for example at least 1000 F. The vent 42 is controlled to maintain a slight positive pressure on the air intake of the air mover 44 when the burner in the gasifier pre-heater 24 is firing during startup mode and when the cooling air is being circulated during normal operation. In some embodiments, additional efficiency increases are provided by the air vented by the vent 42 being exhausted into the combustion air of the thermal oxidizer 50 thereby recovering all of the energy (as preheated combustion air) that has been removed from the gasifying system 14 by the air recirculation system 20.

The energy recovery system 18 can be of a conventional design and construction for burning the producer gas 19 and transferring the recovered-from-gas waste heat to the sludge dryer 12 for pre-drying the wet sludge waste material 11. Such design and construction of conventional systems for recovering waste energy are known to persons of ordinary skill in the art. In the depicted embodiment, for example, the energy recovery system 18 includes at least one thermal oxidizer 50 and at least one air-to-HTF heat-exchange loop 52.

The thermal oxidizer 50 can be of a conventional design and construction for burning the producer gas 19 to generate heat, as is known to persons of ordinary skill in the art. For example, the thermal oxidizer 50 can include a producer-gas inlet connected (e.g., by a fuel line) to the producer-gas outlet 54 of the gasifying system 14, a combustion air inlet, an ignition source, a burner, a combustion chamber, and an exhaust outlet. Also, the thermal oxidizer 50 includes and/or is operably coupled to control components for controlling its operation, which control components can be included in and operated by the control system 26. Such thermal oxidizers 50 are commercially available from Callidus Technologies, Inc. of Tulsa, Okla. In alternative embodiments, a different type of conventional combustion device can be used to burn the producer gas to generate heat from the energy recovered from the carbon-containing waste material.

The air-to-HTF heat-exchange loop 52 can be of a conventional closed-loop design and construction for transferring the waste heat 21 from the gasifying system 14 to the sludge dryer 12, as is known to persons of ordinary skill in the art. In the depicted embodiment, for example, the air-to-HTF heat-exchange loop 52 includes first and second air-to-HTF heat exchangers 56 and 58, a HTF loop line 60, and at least one HTF pump 62. The first/gas-recovery air-to-HTF heat exchanger 56 has an air inlet ducted to the exhaust outlet of the thermal oxidizer 50. The second/heat-recirculating air-to-HTF heat exchanger 58 has an air inlet and outlet connected inline in the ductwork 40 of the air-recirculation system 20. The HTF pump 62 is connected inline in the HTF loop line 60. And the HTF loop line 60 connects the HTF outlet of the first air-to-HTF heat exchanger 56 (e.g., directly) to the HTF inlet of the second air-to-HTF heat exchanger 58, and the HTF outlet of the second air-to-HTF heat exchanger (e.g., indirectly) to the HTF inlet of the first air-to-HTF heat exchanger, in a closed-loop arrangement. In the depicted embodiment, for example, the HTF loop line 60 connects the HTF outlet of the second air-to-HTF heat exchanger 58 to the HTF inlet of the first air-to-HTF heat exchanger 56 indirectly via the air-to-HTF heat exchanger of the sludge-drier pre-heater 22 and then to the sludge dryer 12 for providing heat to these components during operation.

In the depicted embodiment, the HTF is oil, but in alternative embodiments other conventional HTFs (e.g., water or steam) can be used. Also, the air-to-HTF heat exchangers 56 and 58 and the HTF pump 62 include and/or are operably coupled to control components for controlling their operation, which control components can be included in and operated by the control system 26. Such heat exchangers 56 and 58 can be provided by extended-surface waste-heat economizers commercially available from American Heating Company, Inc., of Clifton, N.J. And such HTF pumps 62 are commercially available in packages with the sludge-drier pre-heater 22.

The sludge-drier pre-heater 22 can be of a conventional design and construction known to persons of ordinary skill in the art. For example, the sludge-drier pre-heater 22 can include a combustion air inlet, a fuel (e.g., natural gas) inlet, an ignition source, a burner, a combustion chamber, an exhaust outlet, and a heat exchanger assembly (e.g., an air-to-HTF heat exchanger) for transferring the generated heat from the exhaust outlet to the heat-transfer fluid used in the sludge drier 12. Also, the sludge-drier pre-heater 22 includes and/or is operably coupled to control components for controlling its operation, which control components can be included in and operated by the control system 26. As an example, such sludge-drier pre-heaters 22 are commercially available from Fulton Thermal Corporation of Pulaski, N.Y.

The gasifier pre-heater 24 can be of a conventional design and construction known to persons of ordinary skill in the art. For example, the gasifier pre-heater 24 can include a combustion air inlet, a fuel (e.g., natural gas) inlet, an ignition source, a burner, a combustion chamber, and an exhaust outlet. The exhaust outlet is connected to the air inlet 48 of the gasifying system 14 for directing the generated heat (and the products of combustion) from the gasifier pre-heater 24 into the gasifying system. The combustion chamber can be lined with a refractory material and/or made of a high-heat-resistant alloy such as 310SS. Also, the gasifier pre-heater 24 includes and/or is operably coupled to control components for controlling its operation, which control components can be included in and operated by the control system 26. As an example, such gasifier pre-heaters 24 are commercially available from Hauck Manufacturing Company of Lebanon, Pa.

In addition, an air mover 64, such as a conventional air blower (e.g., an impeller operably connected to an electric motor), a pump, etc., can be provided for drawing fresh air into the combustion air inlet of the gasifier pre-heater 24 during start-up operation and into the air-recirculation system 20 for cooling the gasification system 14 during normal operation (see FIGS. 8-9). The air mover 64 can include and/or be operably coupled to control components for controlling its operation, which control components can be included in and operated by the control system 26. As an example, such blowers 64 are commercially available from Hauck Manufacturing Company of Lebanon, Pa.

In the depicted embodiment, the fuel burned in the pre-heaters 22 and 24 is natural gas, but in alternative embodiments the pre-heaters are adapted for burning other conventional fuels (e.g., propane, bio-gas, no. 2 fuel oil, diesel, or coal) or for generating heat via electric energy (e.g., using electric-resistance heaters) or solar energy (e.g., using solar-thermal systems). Also, in the depicted embodiment, separate pre-heaters 22 and 24 are provided for the sludge drier 12 and the gasifying system 14, but in alternative embodiments at least some components of the these pre-heaters can be combined into shared components (particularly in embodiments in which the sludge drier and the gasifying system use the same HTF). In some alternative embodiments, the sludge-drier pre-heater is eliminated, for example, in applications in which sufficient pre-heating is provided by a heat-exchanger loop connecting the sludge drier to an air-to-HTF heat exchanger positioned at the air inlet 48 (e.g., delivery plenum) of the gasifying system 14.

In addition, in the depicted embodiment, the HTF loop 52 of the energy recovery system 18 recovers and beneficially reuses (for pre-drying wet sludge waste 15 by the sludge-drier pre-heater 22) both the producer gas 19 and the waste heat 21 exhausted from the gasifying system 14. (As such, the energy recovery system 18 can be considered to include the air-recirculation system 20 as a component thereof.) This maximizes the energy efficiency of the waste-treatment system 10, but requires the inclusion of components that add to the cost and space requirements to the waste-treatment system 10.

In some alternative embodiments, the HTF loop recovers and beneficially reuses only the producer gas 19 or the waste heat 21 from the gasifying system 14. In such embodiments in which the waste heat 21 is not recovered and beneficially reused, the HTF loop line is not connected to the second air-to-HTF heat exchanger (which is eliminated). And in such embodiments in which the producer gas 19 is not recovered and beneficially reused, the HTF loop line is not connected to the first air-to-HTF heat exchanger (which is eliminated, along with the thermal oxidizer). Also, in typical embodiments such as that depicted, a single HTF loop is used for recovering and beneficially reusing the waste energy of both the producer gas 19 and the waste heat 21, though in some embodiments two dedicated HTF loops are provided for separately recovering the waste energy of the producer gas and the hot air.

The control system 26 includes control components for controlling the start-up and normal operation of the waste-treatment system 10. The control components can be of a conventional type such as at least one programmed logic controller (PLC) for receiving inputs (e.g., from temperature, pressure, and/or flow-rate sensors) and then operating actuators (e.g., electric motors) to control controlled devices (e.g., blowers, vents, pumps, material-feeding devices, and/or thermal-screw drives) to automatically regulate temperatures, air flow rates, fuel flow rates, material feed and discharge rates, etc. for the sludge drier 12, the gasifying system 14, the ash cooler 16, the energy recovery system 18, the air-recirculation system 20, the sludge-drier pre-heater 22, and the gasifier pre-heater 24. Thus, the control system 26 typically includes controls for the fuel supply, air supply, and ignition for the sludge-drier pre-heater 22 and the gasifier pre-heater 24; air supply to the gasifying system 14 (and thus the air-recirculation system 20); venting of the products of combustion from the air-recirculation system 20 (and thus the gasifying system 14); material feed rates into the sludge drier 12, the gasifying system 14, and the ash cooler 16; rotational speed of the screws of the gasifying system 14; air flow rate into the product chamber 71 of the gasifying system 14; producer-gas flow rate to the thermal oxidizer 50; and the HTF flow rate in the HTF loop line 60. The control system 26 components typically also include temperature sensors (e.g., elements 132 and 130 described in detail with respect to the operation of the system 10) for measuring the temperature of the producer gas 19 and the hot air 21 exiting the product chamber 71 of the gasifying system 14. The control system 26 components typically also include a machine-human interface (MHI) 25 such as a control panel with input devices (e.g., a touch-screen, knobs, and/or buttons) and output devices (e.g., a display screen, gauges, and/or warning lights). In the depicted embodiment, for example, an integrated control system 26 is provided for controlling the operation of all of the components of the waste-treatment system 10, but in alternative embodiments multiple dedicated control systems can be located separately for individually controlling individual components of the waste-treatment system (e.g., three separately located MHIs for controlling the gasifying system 14, the sludge drier 12, and the ash cooler 16). In typical embodiments such as that depicted, the control system 26 includes automatic controls for operating the system 10, including a controller and programming with computer-executable instructions (for performing start-up and operating methods) stored on a computer-readable device (e.g., magnetic disks).

Having described details of the design and construction of the other major components of the waste-treatment system 10, details of the design and construction of the gasifying system 14 will now be described with additional reference to FIGS. 3-7. The gasifying system 14 of the depicted embodiment includes at least one thermal-screw conveyer system 65, at least one screw-mounting assembly 68 for thermal-screw conveyer system, at least one screw-drive assembly 70 for thermal-screw conveyer system, and control components for operating the thermal-screw conveyer system.

The thermal-screw conveyer system 65 includes multiple rotary thermal screws 66 (also referred to herein as "screws") that transfer heat relative to the biosolid waste material 13 while they rotate to convey the material through the thermal-screw conveyer system. The depicted embodiment includes two of the screws 66 arranged in parallel (horizontally) and housed in a housing 72 defining a product chamber 71 for containing the biosolid waste material 13 being processed. The screws 66 each include a rotary shaft 74 with a corresponding helical flighting (e.g., vanes) 76 extending radially outward from the corresponding shaft along at least a substantial portion of the shaft's length so that the flightings overlap and intermesh with each other. In typical commercial embodiments, the screws 66 have a diameter of about 12 inches to about 60 inches, depending on the particular application. The major components of the thermal-screw conveyer system 65 are typically made of a heat-resistance alloy such as 310 stainless steel and carbon steel. The housing 72 can also include an observation port 78 such as that depicted.

The rotor shafts 74 and flightings 76 of the thermal-screw conveyer system 65 of the depicted embodiment are hollow to define internal passageways 75 and 77, respectively, carry a screw thermal fluid or HTF in their internal passageways, and have outer-facing surfaces defining heat-exchange surfaces for indirectly heating and cooling the biosolids waste material 13. The housing 72 of the depicted embodiment is double-walled to define at least one internal passageway 73, carries a screw thermal fluid in the internal passageway(s) between the walls, and has an inner-facing surface defining a heat-exchange surface for indirectly heating and cooling the waste material. In other embodiments, the screws have internal passageways carrying the screw thermal fluid in only the rotor shafts, flightings, and/or housing. In the depicted embodiment, the screw thermal fluid is air, but in alternative embodiments other conventional HTFs (e.g., a molten salt such as Hitec, a molten metal Na, or a metal eutectic such as NaK [78% K]) can be used.

In addition, the flightings 76 cooperate to transport the biosolids waste material 13 along the screws 66, as the material is being processed, from the biosolids material inlet 30 to the ash material outlet 32. During this conveyance, the intermeshing flightings 76 continuously mix and agitate the biosolids waste material 13. And this in turn continuously contacts newly exposed surfaces of the biosolids waste material with newly exposed hot heat-exchange surfaces of the rotor shaft 74, flightings 76, and housing 72 in the product chamber 71. If any chunks or agglomerates form in the biosolids waste material 13, they are abraded or crushed by the rotating and intermeshing screws 66 as the material is processed and conveyed along the screws.

The inlets and outlets of the housing 72 of the gasifying system 14 include the air inlet 48 (and the support shaft 82 and delivery duct 80 connected between the housing and the air inlet), the air outlet 46 (and the support shaft 86 and discharge duct 84 connected between the housing and the air outlet), the biosolids waste material inlet 30, the ash residual material outlet 32, and the producer gas outlet 54. In the depicted embodiment, the air inlet 48 is at the opposite end of the screws 66 from the material inlet 30. So the circulating air (the screw thermal fluid) flows through the thermal-screw conveyor system 65 (e.g., through the internal passageways 75, 77, and 73 of the screw 66 and the housing 72) in the opposite axial direction from the biosolids waste material 13 being gasified. In some other embodiments, the gasifying system is configured so that the circulating air and the waste material being gasified flow in the same axial direction.

At the air-delivery end of the housing 72 is the air inlet 48 to which the air ductwork 40 is connected. In the depicted embodiment, the air inlet 48 is provided by a delivery plenum, with the air delivered from it to the housing internal passageway 73 through a delivery duct 80 and to the rotor and flighting internal passageways 75 and 77 through a hollow support shaft 82 for each screw 66. The air mover 44 can be connected between the air ductwork 40 and the plenum 48, as depicted. And at the air-discharge end of the housing 72 is the air outlet 46 to which the air ductwork 40 is connected. In the depicted embodiment, the air outlet 46 is provided by a discharge plenum, with the hot air 21 delivered to it from the housing internal passageway 73 through a discharge duct 84 and from the rotor and flighting internal passageways 75 and 77 through a hollow support shaft 86 for each screw 66. In alternative embodiments, the housing is adapted so that the air is delivered into and out of the housing internal passageways through the hollow support shafts 82 and 86.

The screw-mounting assemblies 68 and 69 can include, at the respective input/head and output/tail end of the screws 66, the respective rotary support shafts 82 and 86 and respective rotary bearings 88 and 90 mounted to them. The rotary support shafts 82 and 86 extend axially from opposite ends of the screw shafts 74 and through the housing 72. At least one set of the rotary bearings 88 and 90 mount between the housing 72 and the support shafts 82 and 84 to permit the support shafts to rotate freely relative to the housing while providing a seal between them. In the depicted embodiment having the delivery and discharge plenums 48 and 46, at least one additional set of the rotary bearings 88 and 90 mount between the plenums and the support shafts 82 and 86 to permit the support shafts to rotate freely relative to the plenums while providing a seal between them. In addition, a machine frame 92 can provided for supporting the major components of the gasifying system 14. In alternative embodiments, the screw-mounting assemblies include other conventional rotary bearing components for supporting the screws and permitting their rotation.

The screw-drive assembly 70 for driving the screws 66 can include, for driving a directly driven one of the screws 66, a gear-motor (not shown), drive and driven sprockets 94 and 96 operably coupling the gear-motor to the support shaft 86 of the directly driven screw, and a chain (not shown) operably coupling the sprockets together. The screw-drive assembly 70 also includes, for driving the non-directly driven screw, a bull gear 98 mounted on and rotational with each support shaft, with the bull gear of the directly driven screw 66 in meshing engagement and driving the bull gear on the non-directly driven screw. And the control system 26 includes conventional controls for operating the gear-motor to drive the screws 66 at a constant speed.

In alternative embodiments, the screw-drive assembly 70 includes other conventional drive components for cooperatively driving the screws in rotation. In some such alternative embodiments, such as the system shown in FIGS. 8-9, the screw-drive assembly 70 includes dedicated actuators 99 for directly driving each of the screws independently. And the control system 26 can include controls for operating each of the actuators 99 independently to drive the screws at the same or differing speeds while controlling the clocking so that the flights do not collide with each other. The actuators 99 can be provided by, for example, VFD-duty rotary gear-motors that are coupled to and rotationally drive the support shafts at the material inlet end of the housing. In a typical commercial embodiment, gear-motors such as Model No. SK11382/52AZSH VL VG-160M/4CUS by NORD Gear Corporation (Corona, Calif.) are used. In other embodiments, the actuators are provided by other motors, gear-reducers, hydraulic motors or actuators, chains and sprockets, flexible couplings, linear actuators with converter mechanisms for converting the linear motion to rotational motion, a combination of these, or other actuators known to those skilled in the art. And the control system 26 can include a screw-position sensor for each screw, an adjustable speed drive (ASD) for each actuator, and a control program operable by the controller of the control system. In other embodiments, the control system includes other components selected for performing desired coordinated-rotation functions as would be known to a person of ordinary skill in the art. As an example, such alternative screw-drive assemblies 70 are provided commercially by Therma-Flite, Inc. of Benicia, Calif., and disclosed in U.S. Patent Application Pub. No. 2012/0205219, published Aug. 16, 2012, which is hereby incorporated herein by reference.

These and other components of the gasifying system 14, or similar modified versions of them, are included in various of the thermal-screw conveyor systems provided commercially under the BIO-SCRU, HOLO-SCRU, ELECTRIC-SCRU, and PYRO-SCRU trademarks by Therma-Flite, Inc. of Benicia, Calif.; are disclosed in U.S. Pat. No. 5,417,492, issued May 23, 1995, which is hereby incorporated herein by reference; and/or are disclosed in the issued patents and published applications previously incorporated by referenced.

Referring particularly to FIGS. 1 and 4-7, the gasifying system 14 additionally includes an oxygen-delivery system 100 that delivers controlled amounts of oxygen into the product chamber 71 of the gasifier housing 72. (The oxygen-delivery system 100 of the gasifying system 14 is not shown in FIGS. 2-3.) Gasification is an exothermic process requiring oxygen—enough oxygen to sustain the chemical process but not so much that a flame is sustained (in the headspace over the material). So the amount of oxygen that oxygen-delivery system 100 delivers into the product chamber 71 is controlled at a scarcity such that the gasification chemical process does not release enough heat to raise the temperature of the ash in the biosolids waste material 13 above a desired maximum-temperature set point (e.g., 1400 F). This oxygen- and temperature control thereby avoids having the ash in the biosolids material 13 melt and solidify, which would then require the system 10 to be shut down to remove the solidified material from the heat-exchange surfaces of the screws 66 and the housing 72. In some embodiments, the oxygen-delivery system 100 delivers pure oxygen, or a mixture of oxygen and steam, into the product chamber 71. For cost efficiency, in the depicted embodiment the oxygen-delivery system 100 delivers air into the product chamber 71.

The oxygen-delivery system 100 includes an air mover 102, an air distribution manifold or header (e.g., a trunk line 104 and a series of feeder lines 106), and a series of nozzles 108. The air mover 102 can be provided for example by a conventional air blower (e.g., an impeller operably connected to an electric motor), a pump, etc. for forcing the air through the trunk and feeder lines 104 and 106. Such blowers 102 are commercially available under the brand TURBOTRON from Gardner Denver, Inc. of Peachtree City, Ga. In another embodiment, the air mover is provided by a positive-displacement blower controlled by a VFD instead of a valve.

The trunk and feeder lines 104 and 106 can be provided for example by conventional metallic air tubing. The trunk line 104 extends from the air mover 102 (e.g., by a connectors or "ell" joint) and runs axially along the side of the gasifier housing 72. And the feeder lines 106 extend from the trunk line 106 (e.g., by connectors or "ell" joints) and terminate with the nozzles 108, which are connected to the housing 72 at the product chamber 71. The housing 72 is typically double-walled with an outer wall 110 and an inner wall 112 forming the internal passageway 73 that carries the heating and cooling air (the screw HTF). The inner surface of the housing inner wall 112 forms a heat-exchange surface and defines the product chamber 71, and one or more bracing members 116 extend between the double walls for structural support. So the feeder lines 106 extend through the housing outer wall 110 and the nozzles 108 are formed at (and are in fluid communication with) orifices in the housing inner wall 112. In alternative embodiments with a single-walled housing, the nozzles are formed at (and are in fluid communication with) orifices in the single wall of the housing.

Figure 4:
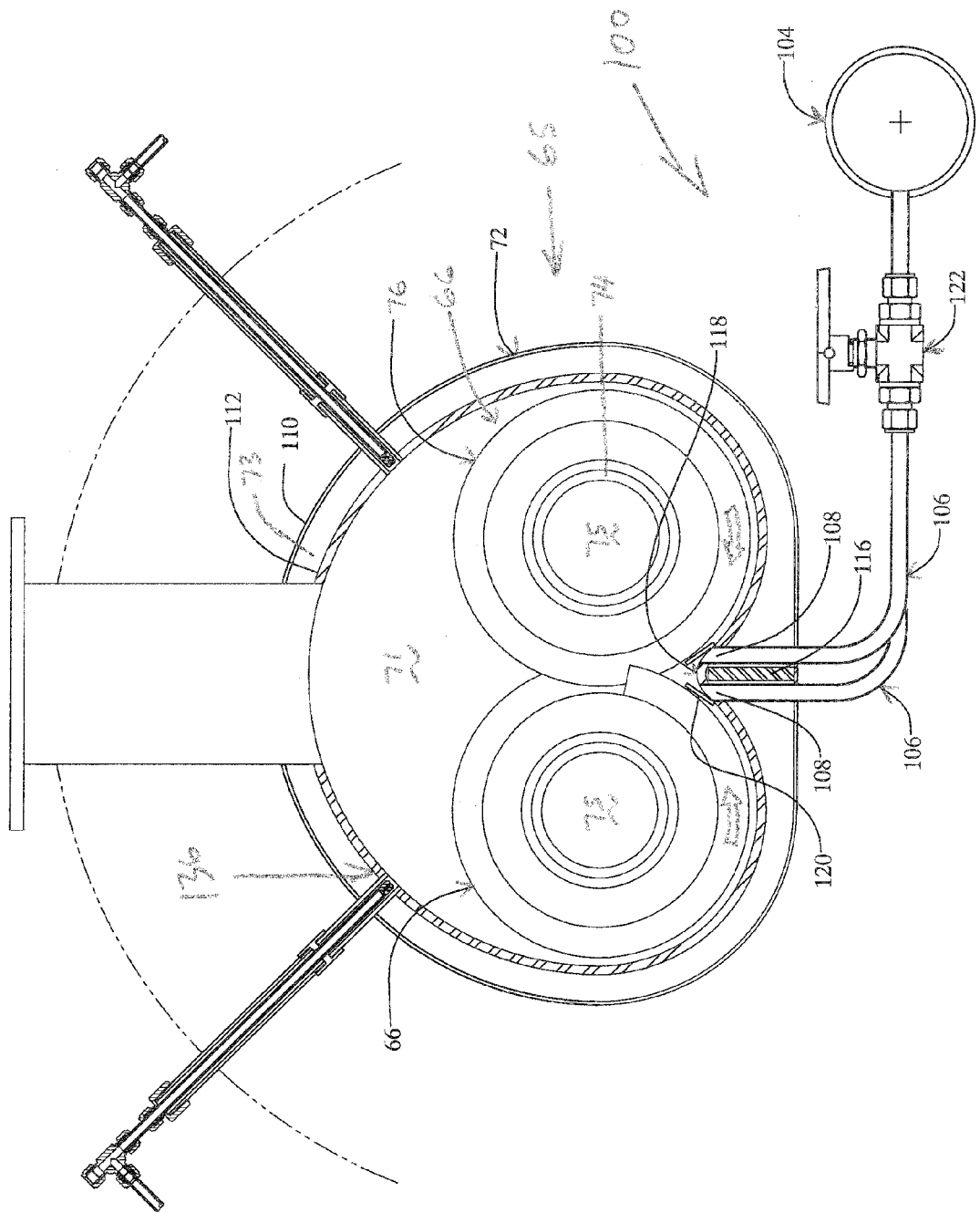
FIG. 4 is an end view of a thermal-screw conveyor of the gasifying system of FIG. 1, showing the thermal-screw housing in cross section.

In the depicted embodiment, the inner wall 112 (and thus the product chamber 71 that it defines) has the general profile shape of a lowercase omega (when viewed from an end, see FIG. 4). In other words, the inner wall 112 is generally circular in cross-section except with an upward recess at the center of its bottom portion configured so that the inner wall generally conforms to the circular shape of both screws 66 below about the center axis of the screws and above the center axis of the screws forms a headspace of the product chamber 71. The orifices in the inner wall 112, and thus the nozzles 108, are positioned at or adjacent an apex portion (an elongated strip/area) 118 of the recessed portion of the inner wall in series along the axis of the housing 72 (see FIGS. 4 and 7). In the depicted embodiment, for example, the nozzles 108 are staggered, alternating between positions immediately to one side or the other of the apex 118 of the recessed portion of the inner wall 112, in a balanced arrangement to help avoid hot spots (see FIG. 5). In this arrangement, the nozzles 108 are sufficiently close to the screws 66 that they are substantially constantly covered by the biosolids material 13 being conveyed through by the screws. In particular, in this position the portion of the biosolids material 13 between the overlapping, intermeshing screw flighting 76 and the rotor shaft 74 is immediately adjacent the nozzles 108 when conveyed past the nozzles. In this way, the air delivered by the oxygen-delivery system 100 under pressure through the nozzles 108 is immediately and directly injected forcibly into the biosolids material 13, so the material absorbs the air as soon as the air enters the product chamber 71 so that the material glows hot but does not form (or at least does not sustain) a flame.

In addition, the oxygen-delivery system 100 can include a series of deflectors 120 positioned adjacent the nozzles 108 (see FIGS. 4-7). In the depicted embodiment, for example, the deflectors 120 extend inward from the inner wall 112 and are angled (with respect to tangent to the inner wall 112) to extend over the nozzles 108 covering them so that the biosolids material 13 does not backflow into the nozzles (e.g., when the screws counter-rotate as indicated by the angular-motion arrows shown in FIG. 4). The deflectors 120 can be provided by flat rectangular plates that are connected to the inner wall 72 at one edge and are free on the opposite edge, with the free edges closer to the apex 118 in the staggered arrangement, as depicted. The reduced airflow area formed by the deflectors 120 and the inner wall 112 helps create vectors of air flow to distribute the air approximately evenly throughout the "pile" over the air nozzles 108. In alternative embodiments, the deflectors can have other configurations, for example curved circular perforated elements, or other elements configured for deflecting the biosolids material 13 from back-flowing into the nozzles 108.

For controlling the air flow rate, the oxygen-delivery system 100 typically includes a series of control valves 122, with a control valve in each feeder line 102 for controlling the airflow based on the biosolids material 13 type and flow rate through the product chamber 71. In addition, the oxygen-delivery system 100 of the depicted embodiment includes a main control valve 124 and a purge valve 126 (see FIGS. 8-9). The main control valve 124 is positioned in the trunk line 104 between the air mover 102 and the first of the feeder lines 106, and is used to shut off the airflow to all of the feeder lines 102 if needed. And the purge valve 126 is positioned in the trunk line 104, typically after the last of the feeder lines 106, and is automatically controlled to adjust the airflow to all of the feeder lines 102 to deliver sufficient air into the product chamber 71 to sustain the chemical reaction but insufficient air for combustion of the resulting off gases from the material 13. All of the valves in the oxygen-delivery system 100 can be manually controlled or automatically controlled by the control system 26, as may be desired. In the depicted embodiment, the feeder control valves 122 and the main control valve 124 are manually controlled, while the purge valve 126 is automatically controlled by the control system 26. In alternative embodiments, the main valve is automatically controlled by the control system and also used for the purpose of the purge valve, which is eliminated.

Having described details of the design and construction of the waste-treatment system 10, example methods of treating carbon-containing waste materials according to another aspect of the invention will now be described. FIGS. 8-11 show a method of treating carbon-containing waste materials, including a start-up process 200 and a normal-operation process 210, according to an example embodiment of the invention. The details of this waste-treatment method are relevant to the design, construction, operation, and use of the waste-treatment system 10 disclosed herein, and should be considered a part of the specification for it. However, it will be understood that this and other methods of treating carbon-containing waste materials according to the present invention can be performed using other waste-treatment systems than those expressly disclosed herein. And the disclosed and other waste-treatment systems and methods can be used for treating other types of carbon-containing waste materials. For example, in the disclosed waste-treatment systems and methods, the waste material being gasified is pre-dried biosolids (e.g., at 90-percent solids) 13, which has been dried to this state from wet sludge 11 by the sludge drier 12, but in other embodiments the method is adapted for use in gasifying other carbon-containing waste materials. In typical embodiments such as that depicted, the control system 26 includes automatic controls for operating the system 10, including a controller and programming with computer-executable instructions (for performing the start-up and operating methods) stored on a computer-readable device (e.g., magnetic disks). It will should noted that any operating parameters (e.g., temperatures) shown in any of the drawing figures are for illustration purposes only and are representative of the depicted embodiment and thus are not limiting of the invention.

FIGS. 8 and 10 show the operation of the waste-treatment system 10 in a start-up mode 200 (see also FIG. 1). In this mode of operation, the gasifier pre-heater 24 is started up to heat the combustion air and deliver it to the internal air passageways of the screw shafts 74, flightings 76, and housing 72 of the gasifying system 14. To do this, the control system 26 is operated to deliver fuel (e.g., by selectively opening a valve in a fuel supply line) and combustion air (e.g., by selectively operating the motor of the air mover 64) into the combustion chamber of the gasifier pre-heater 24, actuate an ignition source to start the combustion, and further control the fuel and air flow rates to maintain the combustion. The heated air 21 exiting the gasifier pre-heater 24 is directed through the gasifying system 14 and the air-recirculation ductwork 40, then back through the gasifier pre-heater in a closed loop (with venting) to continuously increase the heat content in the recirculating hot air. An optional air supply vent (e.g., valve) 128 (excluded from typical commercial embodiments) that can be connected to the air ductwork 40 of the air-recirculation system 20 is closed now so that the air continues to heat up as it recirculates through the gasifier pre-heater 22. The control system 26 is operated to vent the products of combustion through the vent 44 in the air-recirculation ductwork 40 (e.g., by selectively operating a motor operably connected to a pivot shaft of a flapper of the valve).

If the waste material is too wet for cost-efficient gasification, as is typically the case with wet sludge 11, then the sludge drier 12 will be operated to dry the material before delivering it to the gasifying system 14 during normal-operating mode 210. If the sludge drier 12 is to be operated before the gasifier pre-heater 24 is started up, then the sludge pre-heater 22 is started up first. But typically, the gasifier pre-heater 24 is started up first. Then as the gasifying system 14 heats up, the control system 26 can be operated to selectively operate the HTF pump 62 (see FIG. 1) of the energy-recovery system 18. This causes the waste heat 21 recovered from the gasifying system 14 and re-circulating in the air ductwork 40 to be transferred, via the second air-to-HTF heat exchanger 58, to the air-to-HTF heat-exchange loop 52 and thus to the sludge drier 12. And to start up the sludge pre-heater 22, the control system 26 is operated to deliver fuel (e.g., by selectively opening a valve in a fuel supply line) and combustion air (e.g., by selectively operating a motor of an air mover) into the combustion chamber of the sludge pre-heater 24, actuate an ignition source to start the combustion, and further control the fuel and air flow rates to maintain the combustion, with the exhaust heat transferred to the HTF loop 52 (via the heat exchanger assembly of the sludge pre-heater 22) and thus to the sludge drier 12. Typically, no waste material 13 is delivered to the gasifying system 14 during startup.

FIGS. 9 and 11 show the operation of the waste-treatment system 10 in the normal-operation mode 210 (see also FIG. 1). The control system 26 switches to this mode of operation once the gasifying system 14 has been heated up to a temperature set point predetermined based on the waste material 13 to be gasified. In the depicted embodiment, the control system 26 automatically switches to normal mode 210 based on an input from an air-temperature sensor 130 that measures the temperature of the hot air 21 exiting the gasifying system 14 before it returns to the gasifier pre-heater 22. (Additionally or alternatively, the control system 26 can do this based on an input from a gas-temperature sensor 132 located at the gas-outlet 54 of the gasifying system 14; though the system is not yet producing the producer gas, this reading is representative of the process temperature in the product chamber 71.) Thus, the temperature sensor 130 is typically positioned in the air-recirculation ductwork 40. In the depicted example, the waste material 13 being gasified is biosolids at 90-percent solid, so for the material to undergo the chemical reaction of gasification its temperature needs to be at least about 1000 F. So when the temperature sensor 130 registers a reading of the 1000 F temperature set point, the control system 26 automatically switches from start-up mode 200 to normal mode 210. Alternatively, this mode switch can be made manually by an on-site or remote operator.

In the normal-operation mode 210, the screw-drive assembly 70 is operated to start up the screws 66 until they reach their desired rotational speed, which is selected based on the waste material 13 type and flow rate. The control system 26 can automatically control this by selectively operating motors or other actuators (e.g., the VFD-duty rotary gear-motors 99) operably connected to the screw support shafts 86. The waste material 13 is fed into the product chamber 71 of the gasifying system 14 through the material inlet 30. In the case of the waste material 13 being biosolids at 90-percent solid, in the depicted embodiment the material can be fed into the gasifying system 14 at about 1,140 lbs/hr. The control system 26 can control this material feeding by selectively operating motors or other actuators of material conveyance devices (e.g., pumps, valves, and/or belts). Once the material 13 has been feed into the product chamber 71 along most of its length, the gasification air is delivered to the product chamber 71 via the oxygen-delivery system 100. The control system 26 can control the gasification air flow rate by selectively operating the main valve 124, the feeder valves 122, and the purge valve 126.

Because the product chamber 71 has been pre-heated, the gasification process starts right away, so producer gas 19 production begins right away. Then the gasifier pre-heater 24 (or at least its fuel supply) is turned off, the air mover 64 for the gasifier pre-heater 24 remains on, and the air mover 44 for the air-recirculation ductwork 40 remains on to move the air through the recirculating loop. The gasifier pre-heater 24 is not needed at this point because, as discussed below, the energy-recovery system 18 is now operating and the gasifying process becomes autothermal and self-sustaining since the waste material 13 has been preheated. It would not be self-sustaining if the wet material feedstock 11 had not been dried first to supply heat to the gasifying system 14. The air mover 44 recirculates the process air into the gasifier preheater 24 in the startup (heating) mode 200 and also recirculates the same process air in the normal operating (cooling) mode 210. After the gasification process operating temperature set point has been reached and the fuel supply to the gasifier pre-heater 24 stopped (or reduced), the combustion air mover 64 continues to add ambient air to the air recirculation system 20 to prevent the positive pressure from the recirculating air mover 44 from blowing cooling air out the combustion air intake to the combustion air mover 64.

As the gasifying system 14 operates, the biosolids material 13 is gasified/processed to produce hot ash residual material 15 and producer gas 19. The hot ash residual material 15 is then delivered to the ash cooler 16, from the product chamber 71 and through the ash residue material outlet 32, for cooling into the cooled ash residue 17 for disposal. The control system 26 can control the conveyance of these materials 15 and 17 into and out of the ash cooler 16 by selectively operating motors or other actuators of material-conveyance devices (e.g., pumps, valves, and/or belts). In typical embodiments such as that depicted, the hot ash residue 15 has been reduced to about ⅓ of the volume and weight of the dry biosolids 13 fed into the gasifying system 14, thereby significantly reducing the cost for transport and dispose of it once cooled.

The producer gas 19 is delivered from the product chamber 71, through the producer-gas outlet 54, and to the thermal oxidizer 50 (or other combustion device). Valving or other control devices can be included to control the flow rate of the producer gas 19 to the thermal oxidizer 50. Typically, the flow is all of the gas 19 produced, with the gas production rate controlled by the amount of air delivered to the gasifier production chamber 71 via the air mover 102 and by the feed rate of the material 13 delivered to the gasifier production chamber from the sludge dryer 12, which in turn is controlled by the temperature and feed rate of the wet sludge material 11 entering the sludge dryer. If too little air is delivered into the gasifier production chamber 71 from the oxygen-delivery system 100, then the operating temperature could drop below the temperature set point needed to sustain the gasifying chemical reaction, and some of the waste material 13 could pass through unprocessed. To prevent this, the control system 26 operates to deliver more fuel to the gasifier pre-heater 24 to add heat to the production chamber 71, and/or to deliver more air into the gasifier production chamber 71 from the oxygen-delivery system 100 to increase the gasifying chemical reaction. On the other hand, if too much air is delivered into the gasifier production chamber 71 from the oxygen-delivery system 100, the temperature of the cooling air goes too high, so the control system 26 then operates the oxygen-delivery system to reduce the air flow into the gasifier production chamber.

On startup of the sludge dryer 12, the thermal oxidizer 50 is also started up and run until it reaches a predetermined set point (e.g., 1500 F by air permit regulations) before any material 13 from the dryer can be fed into the gasifying system 14. To startup the sludge dryer 12, the control system 26 is operated to deliver combustion air (e.g., by selectively operating a motor of an air mover) into the combustion chamber of the thermal oxidizer 50, actuate an ignition source to start the combustion, and further control the producer gas 19 and air flow rates to maintain the combustion. The heated products of combustion exhausted by the thermal oxidizer 50 are then delivered to the first/gas-recovery air-to-HTF heat exchanger 56 (see FIG. 1) of the energy-recovery system 18. The first air-to-HTF heat exchanger 56 then transfers the heat to the HTF in the HTF loop line 60. The HTF then flows to the second/heat-recirculating air-to-HTF heat exchanger 58 (see FIG. 1) in the air-recirculation ductwork 40 where it absorbs more heat from the recirculating air (and thus cools the recirculating air) and then flows through the sludge-drier pre-heater 22 and to the sludge dryer 12 to deliver the recovered energy to the dryer. Should for any reason the temperature of the HTF not be up to the pre-determined set point as it leaves the sludge-drier pre-heater 22, the control system 26 operates automatically to fire the burner in the sludge-drier pre-heater 22 to raise the temperature of the HTF to the set point. This could be required for example if the sludge dryer 12 is overfed with wet sludge 11 and the output waste material 13 to the gasifying system 14 is thus too wet. The first air-to-HTF heat exchanger 56 then transfers the heat to the sludge drier 12 for drying use by that component. In this way, the method 210 recovers energy in the material 13 that would otherwise be wasted, and uses that recovered energy in further processing of the material, to minimize the net energy consumption of the overall system 10.

As mentioned above, for biosolids at 90-percent solid the waste material 13 needs to be maintained at about 1000 F or higher to sustain the chemical reaction of gasification. But above about 1350 F to about 1400 F, the material will ignite and melt into a sticky substance that is not transported along the screws 66 and that thereby clogs up the product chamber 71. So the control system 26 can automatically operate to maintain the gasifying system 14 within predefined normal operation parameters, in this case, for example, the pre-set temperature range of 1200 F to 1350 F at a pressure of under 50 psig, to maximize the processing rate of the waste material 13 and the energy value of the producer gas 19.

This can be accomplished by the control system 26 monitoring the exiting hot air 21 temperature via the air temperature sensor 130 and/or the exiting producer gas 19 temperature via the producer gas temperature sensor 132 to ensure they stay within the pre-set range. Similarly, in some embodiments the control system 26 can monitor the pressure of the exiting hot air 21 and producer gas 19 via air and gas sensors to ensure they stay within the pre-set range. If the measured hot air 21 and gas 19 temperatures get outside the pre-set range, the control system 26 can control these temperatures by programming of the PLC to adjust the flow rate of the air from the oxygen-delivery system 100 into the product chamber 71 and to adjust the fresh air intake valve 134 and vent 44 in the air recirculation ductwork 40. Increasing or decreasing the oxygen supplied to the product chamber 71 (e.g., by controlling the feeder valves 106) will increase or decrease the recirculating (cooling) air temperature, respectively. And increasing or decreasing the fresh air drawn into the air-recirculation ductwork 40 (e.g., by controlling the air-supply valve 128 in embodiments so equipped) and the hot air vented from the air-recirculation ductwork 40 (e.g., by controlling the vent 44) will decrease or increase the air temperature, respectively. The varying rate of venting is compensated by the varying rate of air addition by the combustion air mover 64. (Note that in this mode the vent 44 is venting only hot air, not products of combustion, as the gasifier pre-heater has been turned off.)

In addition, adjusting the HTF pump 62 (see FIG. 1) to increase or decrease the HTF flow rate will effect the amount of heat drawn out of the hot air 21 by the second/heat-recirculating air-to-HTF heat exchanger 58 and thereby also can be used to control the hot air 21 and gas 19 temperatures within the desired range. Further, the material 13 feed rate and the screw 66 rotational speed can be adjusted manually based on operator observation of the ash residue 15 (if there is too much unreacted carbon in it then the material feed rate and the screw rotational speed can be decreased to increase the residence time within the product chamber 71). And the control system 26 can be programmed to automatically adjust the oxygen delivered from the oxygen-delivery system 100 to the gasifier product chamber 71 to maintain the air temperature within the desired range.

In embodiments with automatic controls, if the temperature measured by the temperature sensor(s) 130 and/or 132 drops below a minimum set point, for example 1100 F, programming of the control system 26 operates to reignite the gasifier pre-heater 24 to add heat to the gasifying system 14. And if the hot air 21 temperature measured by the air temperature sensor 130 drops below an intermediate set point, for example 1200 F, the control system 26 operates to completely close the purge valve 126 of the oxygen-delivery system 100 to force all available oxygen into the product chamber 71 to increase the process temperature. In alternative embodiments, the control system is configured and programmed to control the operation of the system 10 based on different predetermined set points based for example on the material to be processed.

Thus, the air recirculation system 20 functions to heat or cool the air, depending on the circumstances. Typically, the gasification chemical reaction generates sufficient heat to maintain the process, so in the normal operation 210 the air recirculation system 20 operates in a cooling mode to prevent the material 13 in the product chamber 71 from getting too hot. In this embodiment, the recirculating air temperature in the recirculating air ductwork 40 in this cooling mode is typically in the neighborhood of about 650 F, which is typically above the temperature of the HTF in the heat exchangers 56 and 58 and below the process temperature of the material in the product chamber 71.

In addition, in another aspect of the invention, the gasifying systems disclosed herein, and variations of them, can be used in a different method as a pyrolizer. For example, when processing biosolids waste material 13, the gasifying system 14 can be operated in the pyrolizer mode with a lower temperature of the product chamber 71 air (e.g., 850 F to 1100 F) and with a higher output of producer gas 19, but without as much carbon conversion of the waste material 13 as when in the gasifier mode. This pyrolizer mode is not a step function but instead includes a continuum of operational settings at the same process air flow into the product chamber 71, greater material 13 feed rates, less (or the same) cooling air outside the product chamber, and the production of more energy value in the producer gas 19 and much more ash residue 15.

Furthermore, the gasifying systems disclosed herein, and variations of them, can be used in a still another method as a combination pyrolizer/gasifier. For example, when processing biosolids waste material 13, the gasifying system 14 can be operated in the combination pyrolizer/gasifier mode to maximize the reduction in mass of the biosolids into the ash residue 15 and to maximize the fuel value in the producer gas 19, though at the expense of the conversion of carbon to fuel in the feedstock material 13. This method can be beneficial when there is a surplus of dried biosolids 13 to dispose of. A significant challenge in pyrolysis gas production, which produces a gas 19 of higher fuel value per unit volume, is the sticky tars that plug the off-gas passages. This problem is overcome in this system and method by adding some air in the optional upper side ports 136 (see FIG. 4) in the product chamber 71 of the gasifying system 14 for gasifying only the gaseous fraction of the material 13, destroying the tars and condensables by converting them to for example H2, CO, CO2, and/or CH4.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A system for treating carbon-containing material, comprising:
    a gasifying system adapted to gasify a carbon-containing material, the gasifying system comprising:
        a thermal-screw conveyor comprising:
            a product chamber defined by a housing wall;
            a plurality of rotary thermal screws each including a rotor and flighting that intermeshes with the flighting of an adjacent one of the rotary thermal screws, the plurality of rotary thermal screws configured to transfer heat to the carbon-containing material and to convey the carbon-containing material through the product chamber;
            a dedicated actuator for each of the plurality of rotary thermal screws; and
            a control system including controls for operating each of the actuators independently to drive the rotary thermal screws at the same or differing speeds while controlling clocking so that the flightings of the plurality of rotary thermal screws do not collide with each other; and
        an oxygen delivery system including nozzles formed at orifices in the housing wall.

2. The system of claim 1, wherein the oxygen delivery system includes a trunk line and a series of feeder lines, the feeder lines extending from the trunk line and terminating with the nozzles.

3. The system of claim 1, wherein each rotor and flighting of the plurality of rotary thermal screws defines internal passageways containing a thermal fluid.

4. The system of claim 1, wherein the housing wall is double walled to define at least one internal passageway containing a thermal fluid.

5. The system of claim 1, wherein the thermal-screw conveyor is configured to operate at a temperature up to 1400° F.

6. The system of claim 1, wherein the control system further comprises:
    a controller;
    a screw-position sensor for each of the plurality of rotary thermal screws, the screw-position sensor in communication with the controller;
    an adjustable speed drive for each dedicated actuator, the adjustable speed drive in communication with the controller; and
    a control program operable by the controller.

7. The system of claim 1, further comprising a drier system adapted to pre-dry the material for delivery to the gasifying system.

8. The system of claim 7, further comprising an energy-recovery system adapted to recover waste energy from the gasifying system and deliver the recovered waste energy to the gasifying system or the drier system.

9. The system of claim 1, wherein the nozzles are positioned adjacent an apex of a recess at a center of a bottom portion of the housing wall in series along an axis of the housing.

10. The system of claim 9, wherein the nozzles are staggered, alternating between positions immediately to one side or the other of the apex of the of the recessed portion of the housing wall in a balanced arrangement to avoid hot spots.

11. The system of claim 1, further comprising a series of deflectors positioned adjacent the nozzles, the deflectors extending inward from the housing wall and angled to extend over the nozzles, covering the nozzles so that biosolids material does not backflow into the nozzles.

12. The system of claim 2, further comprising a series of control valves, with a control valve in each feeder line.

* * * * *